Patented Sept. 10, 1935

2,013,988

UNITED STATES PATENT OFFICE 2,013,988

PROCESS OF PREPARING ACETYL CHLORIDE

Georg Meder, Munster-on-the-Taunus, Erich Eggert, Frankfort-on-the-Main-Sindlingen, and Albert Grimm, Knapsack, near Cologne-on-the-Rhine, Germany, assignors to I. G. Farbenindustrie Aktiengesellschaft, Frankfort-on-the-Main, Germany No Drawing. Application April 24, 1933, Serial No. 667,612. In Germany April 29, 1932

6 Claims. (Cl. 260—123)

This invention relates to an improved process of preparing acetyl chloride.

We have found that acetyl chloride is obtained in a very good yield by causing gaseous phosgene to react at a raised temperature upon liquid acetic acid and continuously removing by evaporation the acetyl chloride thus formed, from the reaction mixture. The temperature is preferably kept between about 80° C. and about 110° C.

As catalysts, in order to promote the reaction there may be used such compounds of metals of the second and third group of the periodic system as are dissolved by hot acetic acid, as for instance magnesium oxide, anhydrous calcium chloride, aluminium acetate.

Phosgene is sufficiently well dissolved in liquid acetic acid by simply introducing phosgene into the liquid acetic acid; however, considering the fact that only the dissolved portion of the phosgene reacts with acetic acid, it is advisable to promote the intimate contact of the gaseous phosgene with the liquid acetic acid. This may, for instance, be effected by causing the reaction to take place in an apparatus containing a high column of liquid or by passing the phosgene through porous plates in the liquid.

The claims are directed to atmospheric pressure. It is to be understood, however, that the use of slightly raised or slightly lowered pressures falls within the scope of the claims, indeed in some cases a small superpressure can hardly be avoided owing to the column of liquid. Working at a reduced pressure decreases the solubility of the phosgene in the acetic acid but simultaneously accelerates the removal by evaporation of the acetyl chloride produced. By raising temperature the reaction velocity is promoted. It is to be understood, however, that this process is limited to temperatures at which the acetic acid is still liquid.

The acetyl chloride can readily be isolated by cooling the gases which are removed, if desired, while washing it with a liquid which absorbs the acetyl chloride without absorbing much hydrogen chloride.

The following examples serve to illustrate the invention, but they are not intended to limit it thereto:

(1) Phosgene is continuously introduced into a 1 liter flask which contains 600 grams of glacial acetic acid and is connected with a dephlegmator. The temperature of the mixture is maintained at about 110° C. Glacial acetic acid is continuously fed into the boiling mixture in the same degree as the reaction proceeds. The vapors of acetyl chloride which are evolved are condensed in a refrigerator. Any acetic anhydride which may be produced is returned to the reaction vessel. The yield is almost 100 per cent. calculated upon the acetic acid.

(2) The process is carried out as described in the preceding example, 60 grams of anhydrous magnesium acetate being added as accelerator to the glacial acetic acid.

(3) A uniform current of phosgene is conducted through a porous body in a washing bottle containing glacial acetic acid which is heated to about 80° C. and has dissolved in it about 1 per cent. of magnesium oxide as accelerator. The acetic anhydride carried along with the escaping vapors is condensed in a water cooled condenser and returned to the bottle. The gases leaving the condenser are liquefied in a refrigerator, while hydrochloric acid and carbonic acid are allowed to escape. During the reaction glacial acetic acid is continuously run into the bottle.

We claim:

1. The process which comprises acting with gaseous phosgene at a temperature raised with respect to usual room temperature and at atmospheric pressure upon liquid acetic acid while continuously removing from the reaction mixture the acetyl chloride formed by allowing the same to evaporate.

2. The process which comprises acting with gaseous phosgene at a temperature between about 80° C. and about 110° C. and at atmospheric pressure upon liquid acetic acid while continuously removing from the reaction mixture the acetyl chloride formed by allowing the same to evaporate.

3. The prcess which comprises passing phosgene through porous plates, in order to effect fine distribution into a reaction vessel containing acetic acid of a temperature between about 80° C. and about 110° C. while continuously removing from the reaction mixture the acetyl chloride formed by allowing the same to evaporate.

4. The process which comprises acting with gaseous phosgene at a temperature raised with respect to usual room temperature and at atmospheric pressure upon liquid acetic acid in the presence of a compound of a metal of the second and third groups of the periodic system which is soluble in hot acetic acid, while continuously removing from the reaction mixture the acetyl chloride formed by allowing the same to evaporate.

5. The process which comprises acting with gaseous phosgene at a temperature between about 80° C. and about 110° C. and at atmospheric pressure upon liquid acetic acid in the presence of a compound of a metal of the second and third groups of the periodic system which is soluble in hot acetic acid, while continuously removing from the reaction mixture the acetyl chloride formed by allowing the same to evaporate.

6. The process which comprises passing phosgene through porous plates, in order to effect fine distribution into a reaction vessel containing acetic acid of a temperature between about 80° C. and about 110° C. and a compound of a metal of the second and third groups of the periodic system which is soluble in hot acetic acid, while continuously removing from the reaction mixture the acetyl chloride formed by allowing the same to evaporate.

GEORG MEDER.
ERICH EGGERT.
ALBERT GRIMM.